(12) United States Patent
Antonopoulos

(10) Patent No.: US 11,275,760 B2
(45) Date of Patent: Mar. 15, 2022

(54) ONLINE SCHEMA AND DATA TRANSFORMATIONS

(71) Applicant: Microsoft Technology Licensing, LLC, Redmond, WA (US)

(72) Inventor: Panagiotis Antonopoulos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1362 days.

(21) Appl. No.: 14/526,118

(22) Filed: Oct. 28, 2014

(65) Prior Publication Data

US 2016/0117375 A1    Apr. 28, 2016

(51) Int. Cl.
*G06F 16/27* (2019.01)
*G06F 16/21* (2019.01)
*G06F 16/2453* (2019.01)

(52) U.S. Cl.
CPC ............ *G06F 16/27* (2019.01); *G06F 16/214* (2019.01); *G06F 16/219* (2019.01); *G06F 16/24542* (2019.01)

(58) Field of Classification Search
CPC ............. G06F 17/30575; G06F 17/303; G06F 17/30309; G06F 16/27; G06F 16/214; G06F 16/219; G06F 16/2474; G06F 16/24542

See application file for complete search history.

(56) References Cited

U.S. PATENT DOCUMENTS

| | | | |
|---|---|---|---|
| 6,122,644 A * | 9/2000 | Graefe | ............... G06F 16/284 |
| 6,718,320 B1 | 4/2004 | Subramanian et al. | |
| 6,996,558 B2 | 2/2006 | Dettinger et al. | |
| 7,089,260 B2 | 8/2006 | Dettinger et al. | |
| 7,634,515 B2 | 12/2009 | Hunter et al. | |
| 7,873,672 B2 | 1/2011 | Stefani et al. | |
| 8,027,955 B2 | 9/2011 | He et al. | |
| 8,041,675 B1 | 10/2011 | McCain | |
| 8,229,952 B2 | 7/2012 | Cras et al. | |
| 8,671,084 B2 | 3/2014 | Chowdhary et al. | |

(Continued)

FOREIGN PATENT DOCUMENTS

CN             101226537 A        7/2008

OTHER PUBLICATIONS

"International Search Report & Written Opinion Received For PCT Application No. PCT/US2015/057274", dated Jan. 22, 2016, 12 Pages.

Ronstrom, Mikael, "On-line Schema Update for a Telecom Database", 16th International Conference on San Diego Data Engineering, Feb. 29, 2000, 10 Pages.

(Continued)

*Primary Examiner* — James E Richardson

(57) ABSTRACT

Transforming a database while allowing the data in the database to be available to database users during the transformation of the database. A method includes creating a new version of metadata for an old copy of database items. The method further includes creating a copy of data items to be transformed in the old copy of database items while applying a transformation to the data while migrating data from the old copy of database items to the new copy of database according to the new version of metadata. The method further includes while migrating data from the old copy of database items to the new copy of database items, servicing user queries made against the old copy of database items to allow the database to remain online while transforming data items in the database.

20 Claims, 3 Drawing Sheets

(56) References Cited

U.S. PATENT DOCUMENTS

| | | | |
|---|---|---|---|
| 8,712,970 B1 | 4/2014 | Sim-Tang | |
| 8,768,978 B2 | 7/2014 | Pearson et al. | |
| 8,825,601 B2 | 9/2014 | Huynh et al. | |
| 2004/0193567 A1* | 9/2004 | Dettinger | G06F 16/24534 |
| 2005/0071359 A1 | 3/2005 | Elandassery et al. | |
| 2005/0114404 A1* | 5/2005 | Pintar | G06F 16/2474 |
| 2007/0033236 A1 | 2/2007 | Kaneko et al. | |
| 2007/0174317 A1 | 7/2007 | Bangel et al. | |
| 2007/0214104 A1* | 9/2007 | Miao | G06F 16/24542 |
| 2007/0282515 A1* | 12/2007 | Arora | G06F 16/213 |
| | | | 701/101 |
| 2008/0098046 A1* | 4/2008 | Alpern | G06F 17/30306 |
| 2009/0234799 A1* | 9/2009 | Betawadkar-Norwood | |
| | | | G06F 16/2471 |
| 2011/0252002 A1* | 10/2011 | Ben-Dyke | G06F 16/213 |
| | | | 707/661 |
| 2012/0023080 A1* | 1/2012 | Bolohan | G06F 16/219 |
| | | | 707/705 |
| 2012/0036166 A1* | 2/2012 | Qiu | G06F 17/30297 |
| | | | 707/803 |
| 2013/0013648 A1 | 1/2013 | Monjas Llorente et al. | |
| 2013/0166508 A1 | 6/2013 | Eluri et al. | |
| 2014/0156684 A1* | 6/2014 | Zaslavsky | G06F 16/258 |
| | | | 707/756 |
| 2015/0121146 A1* | 4/2015 | Mielenhausen | G06F 11/079 |
| | | | 714/37 |
| 2015/0227533 A1* | 8/2015 | Goldstein | G06F 16/2379 |
| | | | 707/661 |
| 2017/0300521 A1* | 10/2017 | Debowski | G06F 16/213 |

OTHER PUBLICATIONS

Sockut, et al., "Online Reorganization of Databases", In ACM Computing Surveys, vol. 41, Issue 3, Article 14, Jul. 2009, 136 Pages.

"Protect your data with backup and restore processes", Published on: Jan. 25, 2013 Available at http://office.microsoft.com/en-001/access-help/protect-your-data-with-backup-and-restore-processes-HA010341510.aspx.

"Perform Index Operations Online", Retrieved on: Sep. 27, 2014 Available at http://msdn.microsoft.com/en-us/library/ms177442.aspx.

Boukauvalas, et al., "Online Index Operations", Published on: Mar. 2007 Available at http://download.microsoft.com/download/8/5/e/85eea4fa-b3bb-4426-97d0-7f7151b2011c/OnlineIndex.doc.

"Office Action Issued in European Patent Application No. 15790417.8" dated Jun. 27, 2018, 6 Pages.

Summons to Attend Oral Proceedings in European Patent Application No. 15790417.8, Mailed Date: Mar. 21, 2019, 7 Pages.

Groothuyse, et al., "GlobeTP: Template-Based Database Replication for Scalable Web Applications", In Proceedings of the 16th International Conference on World Wide Web, May 8, 2007, 10 Pages.

"First Office Action and Search Report Issued in Chinese Patent Application No. 201580056638.X", dated Jan. 3, 2020, 13 Pages.

"Second Office Action Issued in Chinese Patent Application No. 201580056638.X", dated Sep. 11, 2020, 10 Pages.

"Office Action Issued in Indian Patent Application No. 201717013716", dated Dec. 21, 2020, 7 Pages.

"Third Office Action Issued in Chinese Patent Application No. 201580056638.X", dated Apr. 6, 2021, 12 pages.

* cited by examiner

ONLINE SCHEMA AND DATA TRANSFORMATIONS

BACKGROUND

Background and Relevant Art

Frequently, database users need to make schema (e.g. change the type of a column) or data (e.g. split the Name column into two columns: First and Last name) modifications which require updating a large volume of data. This might be part of further application upgrades or due to some flaw in the original design of the schema. Such operations may require an update on every row in the table of a database. Currently, these operations can only be performed offline which introduces a huge amount of downtime for the application. While the modification is happening, the database tables remain inaccessible, which could lead to many hours of unavailability for some large tables.

Moreover, when these changes are part of application upgrades, there is usually multiple schema or data transformations that need to occur before the new application can be deployed. For example, Application V1 requires database schema V1 whereas Application V2 requires schema V2.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for transforming a database while allowing the data in the database to be available to database users during the transformation of the database. The method includes creating a new version of metadata for an old copy of database items for the database for transforming the old copy of database items to a new copy of database items for the database to transform items in the old copy of database items. The method further includes creating a copy of data items to be transformed in the old copy of database items while applying a transformation to the data items to be transformed in the old copy of database items while migrating data from the old copy of database items to the new copy of database items to transform data items in the old copy of database items. The method further includes while migrating data from the old copy of database items to the new copy of database items, servicing user queries made against the old copy of database items to allow the database to remain online while transforming data items in the database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the invention teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
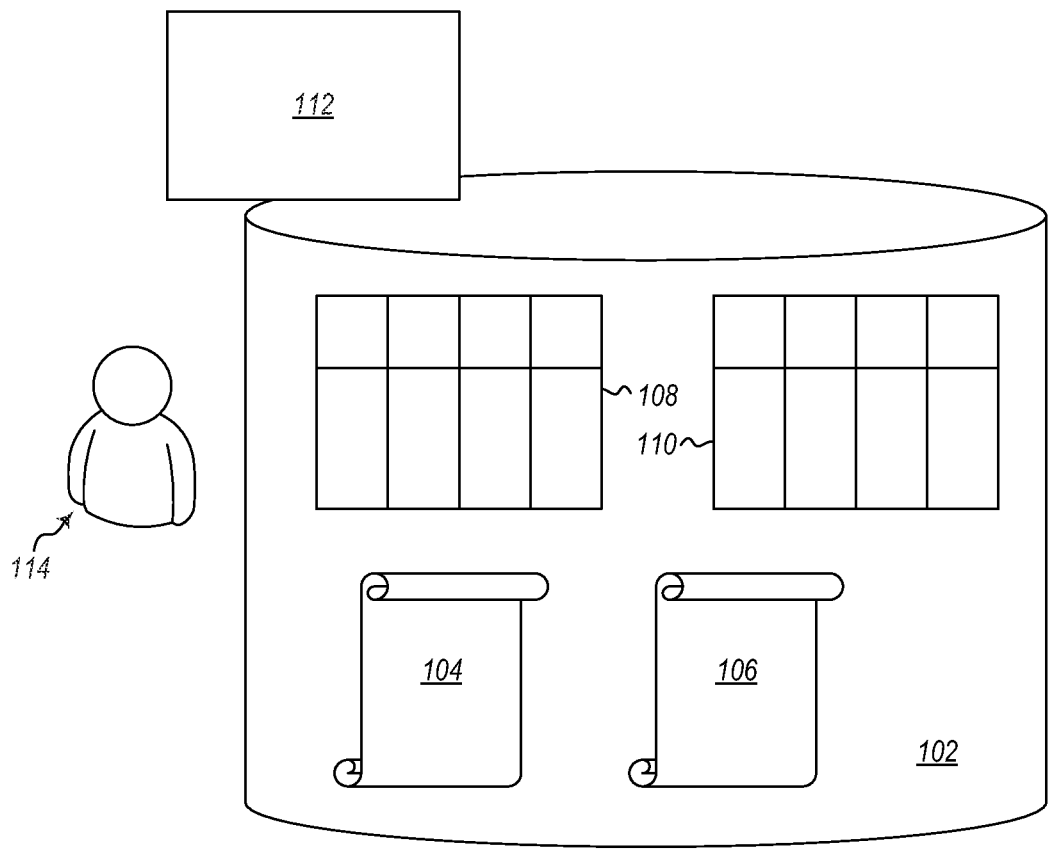
FIG. 1 illustrates a database including new copies of data items and old copies of data items.

The following examples are illustrated in the context of SQL Server®, available from Microsoft Corporation of Redmond, Wash. Thus, the particular database statements illustrated are particular to that implementation. However, it should be appreciated that other embodiments may use other database products and their corresponding statements. Referring now to FIG. 1, an example database 102 is illustrated. Some embodiments herein may implement an old version 104 of a database schema and a new version new copy of database items of a database schema. Further, the embodiments may maintain an old copy 108 of database items according to the old version 104 of the database schema and a new copy 110 of database items according the new version new copy of database items of the database schema. By performing schema and data type change operations while a database 102 is available to a user (i.e. the database 102 is online), an application 112 can operate against the old version 104 of the schema until all the required changes in the database 102 have been completed. Then, the database administrator 114 can switch the schema to the new version new copy of database items and an application 112 can also be upgraded without any (or with very minimal) downtime. Embodiments herein may abstract all the implementation logic to perform such operations from the administrator 114. The administrator 114 simply describes the required transformation and the maintenance of the various copies of the database items, such as tables, is handled internally by the system.

Figure 2:
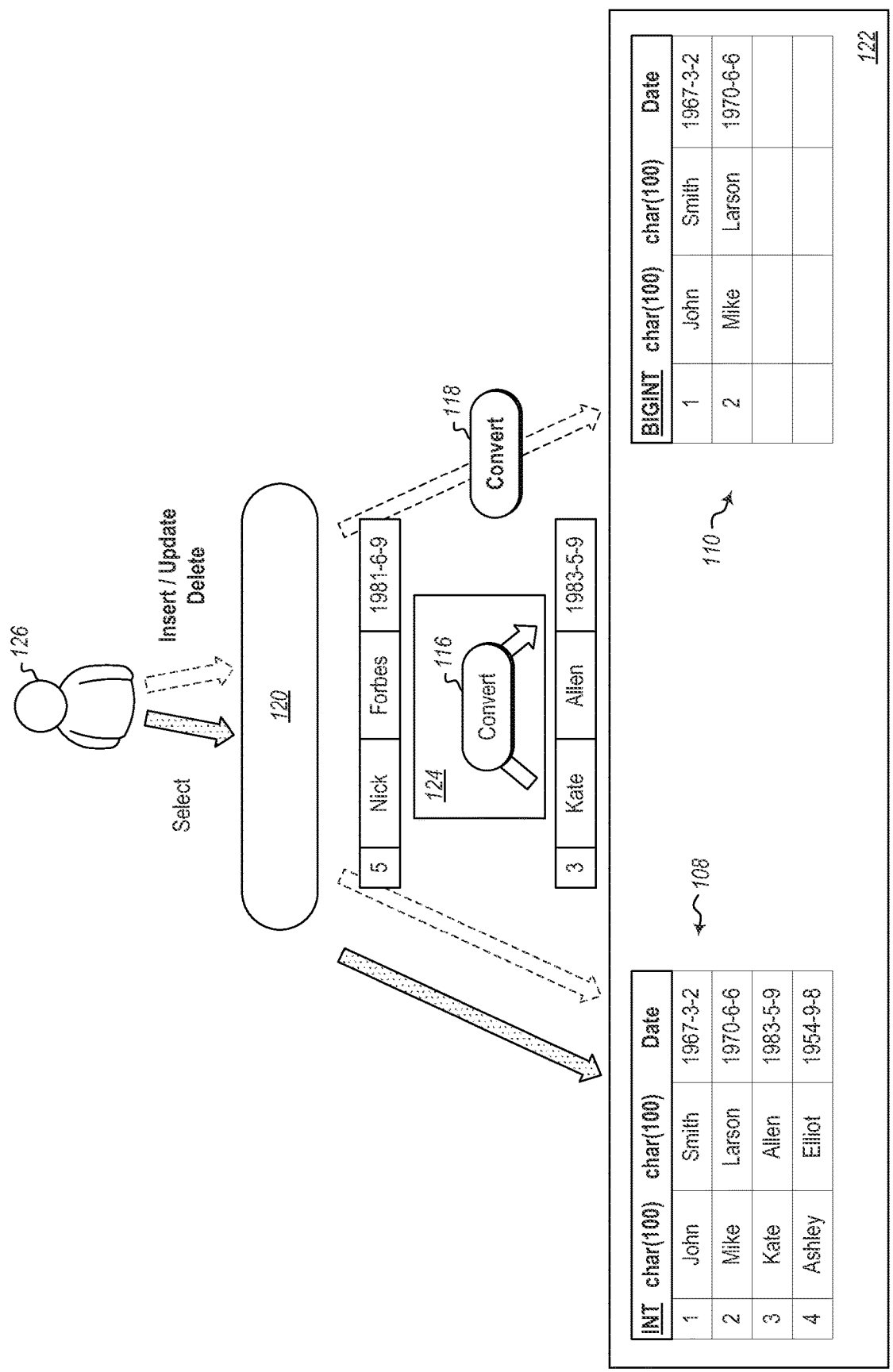
FIG. 2 illustrates operations to transform a database.

For example, with reference to FIG. 2, in some embodiments, data can be migrated from an old column type into a new column type, while converting the data type from the old data type to the new data type. In particular, FIG. 2 illustrates a schema change where a column of type "int" is changed to a column of type "big int" to allow larger numbers to be included in the column. Entries in the int column in old column are converted to the bigint data type and moved into the new column. Embodiments can maintain two copies 108 and 110 of the data. A background thread 116 that is migrating the original data in the old copy 108 is modified to convert the datatype for this specific column as the data gets copied to the new copy 110. For concurrent updates, the part of the query plan that maintains the new copy 110 of the data is now modified to inject a data type conversion operator, such as a "CONVERT" operator 118 in SQL Server® from Microsoft, Corporation, or other data type conversion operator in other products, that converts the data to the new datatype. Even though this is performing only a data type conversion, this logic can be extended to transform the data through arbitrary user-defined expressions, allowing even more complicated scenarios required by application upgrades (such as splitting a Name into two columns).

Embodiments may perform the following phases to migrate a database, while the database is online and available to users.

Prepare phase: This phase adds a new version of the table to metadata, creates new rowsets, and enables versioning to perform a snapshot scan of the data.

Build phase: The build phase executes statements to copy data in the database, such as INSERT . . . SELECT in SQL Server® from Microsoft Corporation of Redmond, Wash., to populate the new copy 110 of the table. A database query optimizer 120 knows this is a "special" data manipulation language and generates a plan that will copy the data from the old version 108 to the new version 110. As illustrated in FIG. 2, operations that simply select data from the database can access the old version 108. Operations that insert, update or delete data access both the old version 108 and the new version 110.

Final phase: In the final phase, the table is locked exclusively (such as a schema modification lock such as an SCH-M lock in SQL Server®) for a very short amount of time in order to update the metadata, dropping the old version 108 of the table. A schema modification lock prevents concurrent access to the table. This means the schema modification lock blocks all outside operations until the lock is released During the online schema and/or data transformations, concurrent select operations are accessing the old version 108 of the table, but data manipulation operations (such as inserts, updates and deletes) need to maintain both the old version 108 and the new version 110. Metadata informs the query optimizer that this is an "online" table and therefore a special query plan is generated to maintain it properly as illustrated in FIG. 2.

This process can be reused to support a wide range of operations while the database is online. The new version 110 of the table is created with the new schema new copy of database items specified by the user.

For this to happen, the relational metadata is versioned, so that the maintenance of the new version 110 of the table can be done properly, applying the required transformations. Further, the new rowsets in the new copy 110 in the storage engine 122 are created with the new version of database items of the schema. Additionally, statements to insert and select data, such the INSERT . . . SELECT statement in SQL Server®, executed by the table builder 124 transforms the data while copying it over to the new version 110 of the table. The query optimizer 120 sees the two versions of the table and generates the appropriate query execution plan to apply the transformation while copying the data. Concurrent data manipulation language operations can see the two versions of the schema/data from metadata and the query optimizer 120 generates a special plan to maintain the new version 110 of the data, while applying the required transformations.

Another implementation uses a table build process where concurrent update operations do not have to maintain the new version/copy of the data, but the background task processes the delta of the updates and applies the required transformation as it is copying it to the new version 110 of the data. When the delta becomes really small, the table is locked, so that the background task can copy the last portion of the data and finalize the operation. The delta could be, for example, on the order of 100s to 1000s of rows that need to be processed. However, the delta should be small enough, in some embodiments, so that the migration is fast and it will only take a few milliseconds In addition to the approach above which is more generic and can cover most column altering, adding or dropping operations, such as the ALTER COLUMN operations of SQL Server®, embodiments can handle specific type changes on compressed columns as metadata-only operations. This is possible for the cases where the format and content of any row with the original column type is identical to the row format and content with the new column type. In this case embodiments can simply update the relational engine and storage engine metadata without any updates on the rows. There are currently many column altering, adding or dropping operations that are handled as metadata-only operations. However, data compression provides the opportunity to support a few more cases that might be commonly used.

For the rowsets where data compression is enabled, all columns are stored in storage engine as variable length columns and in combination with the compression algorithms embodiments are using, the requirement above is valid, for example, for the following type changes:

smallint→int→bigInt
smallmoney→money
char(N)→char(M), where N<=M
char(N)→varchar(M), where N<=M
binary(N)→binary(M), where N<=M
binary(N)→varbinary(M), where N<=M Data Definition Language The data definition language may include additional options of allowing a user to specify that an operation used in a schema or data transformation is to be conducted as an "online" operation. The example below illustrates the ALTER TABLE . . . ALTER COLUMN statement included in SQL Server® which includes parameters to indicate that this is an "online" operation:

```
ALTER TABLE [ database_name . [ schema_name ] . | schema_name . ] table_name
{
   ALTER COLUMN column_name
   {
      [ type_schema_name. ] type_name
       [ (
         {
            precision [ , scale ]
            | max
            | xml_schema_collection
         }
      ) ]
      [ COLLATE collation_name ]
      [ NULL | NOT NULL ] [ SPARSE ]
      [ WITH ONLINE = ON/OFF]
   .....
   }
.....
}
```

The parameter [WITH ONLINE=ON/OFF] provides the ability to specify how the operation will be performed.

Metadata

The data definition language for online column altering, in some embodiments, starts by following the same logic as the offline operation with the difference that it only takes an intent shared lock instead of an exclusive schema modification lock. This allows concurrent data manipulation languages to proceed.

Metadata Modifications

Although metadata checks can be done under intent shared lock (i.e. a lock that indicates the intention of a transaction to read some (but not all) resources lower in the hierarchy by placing shared locks on those individual resources, which prevents other transactions from acquiring an exclusive lock), metadata updates need special handling as they normally require an exclusive lock on the table. To solve this problem, instead of updating the column metadata in-place:

- A new copy of the column is created with the new properties (type, etc.). This means that the old column information is still available.
- The new column is created only in memory and no system tables are updated. If system tables were updated, embodiments would commit the transaction that updated them to release the row locks. This would cause problems in recovery.
- The new column will not be added to the column collection of the table, so that it is not visible by concurrent queries, unless explicitly requested. This means that the algebrizer can still load all the columns as usual and no changes are required to handle the "online" column.

Metadata Recovery on Rollback

Special logic is also implemented to handle rolling back the data definition language. In general, metadata is making the assumption that the data definition language operation is holding an exclusive schema modification lock on the object and no other entity can be holding a reference, so, in case of failure, embodiments just remove the whole object from the metadata cache. On-disk consistency is handled by transaction rollback, so on the next request embodiments simply reload the object from disk.

Since this is an online operation, embodiments are only holding an intent shared lock on the table (not an exclusive schema modification lock). As embodiments cannot get more locks on rollback, others might be holding references for this object and therefore embodiments cannot simply remove it from the cache.

To cleanup metadata on rollback, embodiments use ref counting in combination with a new virtual log record specific to online column altering operations. The virtual log record is a virtual in the sense that it does not describe on-disk changes that need to be rolled back, but only is a placeholder that makes a call back to the database server code to execute some logic that rolls back the in-memory values. On rollback, the virtual log record will mark the "online" column as aborted, so that new queries cannot get a reference to it. If there are no references on the column object, it will drop it. Otherwise, it will remove its reference and the last entity that releases a reference will actually remove it from the metadata cache.

Blocking Concurrent Operations

Since embodiments are making metadata changes in-memory, embodiments avoid concurrent access by two "online" operations. For this reason, embodiments will take a special lock to prevent concurrent online operations on the same table. This lock is held for the duration of the whole operation.

Concurrent Queries

As described above, the new column will not be added in the column collection and will not be visible unless explicitly requested. This means that the Algebrizer will always use the "old" column metadata and the query optimizer 120 will generate a plan based on that.

As illustrated in FIG. 2, data selection queries, such as SELECT queries in SQL Server®, can only use the old copy 108 of database items during an online table rebuild operation, so they will try to access the rowset that contains the "old" column. Since the metadata used for the plan generation matches the format of the data in SE, all data selection queries should just work.

Embodiments may have functionality with respect to errors that are caused by the type conversion that occurs during the column altering operation. For example, when the user is accessing a table where column c1 is 'bigint', but it is currently altered to 'int', if the inserted value cannot fit in 'int', the user will get an error that there was an overflow for the type 'int'. However, from the user's perspective, the column type is still 'bigint' and this is what the system views are reporting. Thus, in some embodiments, additional information may be added to these error messages to alert the user with additional details regarding the cause of the error.

If a column alter operation is cancelled or fails, for example, because the data transformation is not possible for a given row, rolling back the operation can be done almost immediately by simply destroying the second copy (e.g. the new copy 110 of database items.

Embodiments may leverage features of various implementations to implement certain optimizations. For example, because embodiments create a new copy of the data (e.g. new copy 110 of database items), optimizations such as minimal logging, can be used to speed up operations and reduce the required log space.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
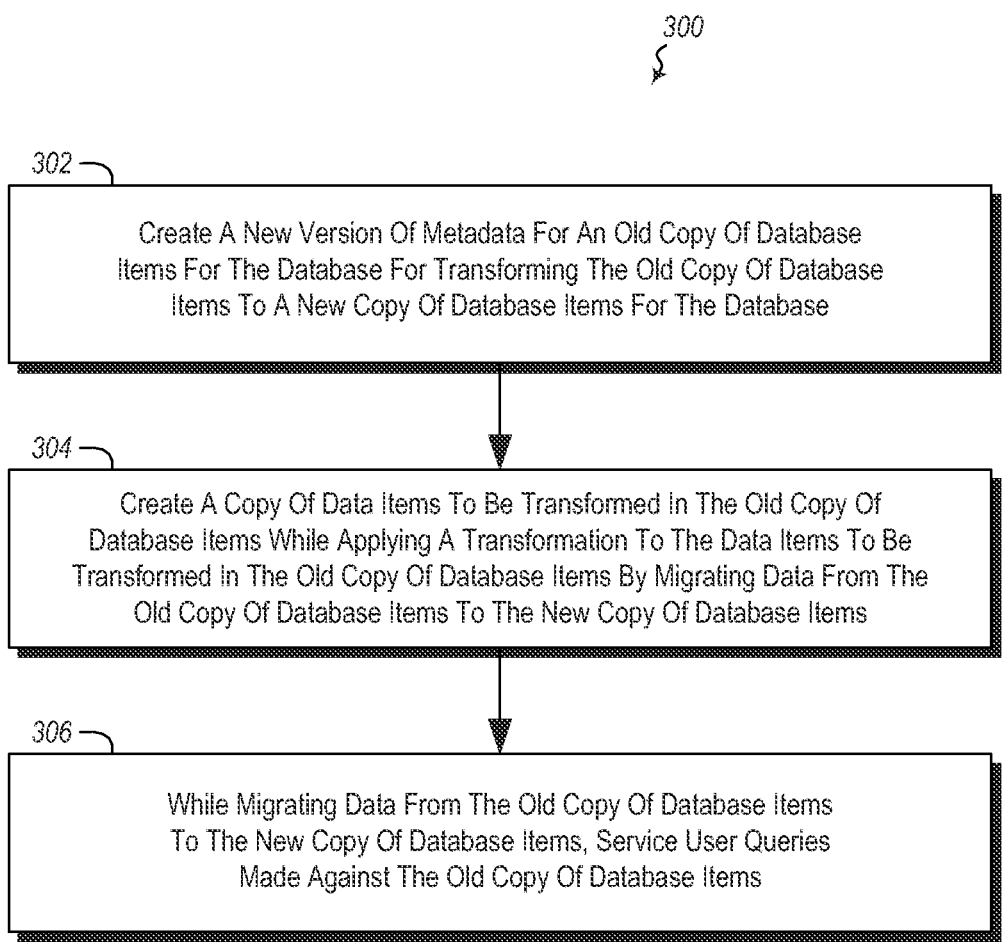
FIG. 3 illustrates a method of transforming a database.

Referring now to FIG. 3, a method 300 is illustrated. The method 300 may be practiced in a computing environment. The method 300 includes acts for transforming a database while allowing the data in the database to be available to database users during the transformation of the database. The method includes creating a new version of metadata for an old copy of database items for the database for transforming the old copy of database items to a new copy of database items for the database to transform items in the old copy of database items (act 302). For example, as illustrated in FIG. 1, a new version 106 of a database schema is created for an existing copy 108 of database items.

The method 300 further includes creating a copy of data items to be transformed in the old copy of database items while applying a transformation to the data items to be transformed in the old copy of database items while migrating data from the old copy of database items to the new copy of database items to transform data items in the old copy of database items (act 304). This is done according to the new version of the metadata. Thus, for example, data items from the old copy 108 of data items are copied to the new copy 110 of data items according to the new version 106 of the database schema.

The method 300 further includes, while migrating data from the old copy of database items to the new copy of database items, servicing user queries made against the old copy of database items to allow the database to remain online while transforming data items in the database (act 306). Thus, as illustrated in FIG. 2, a user 126 can send various database queries which are serviced by the old copy 108 of database items.

The method 300 may be practiced where creating a copy of data items to be transformed in the old copy of database items comprises taking a snapshot of the old copy of database items.

The method 300 may be practiced where servicing user queries made against the old copy of database items comprises servicing the queries from the new copy of database items and the old copy of database items, including updating both the new copy of database items and the old copy of database items when the user queries comprise data updates. An update may include at least one of an insert operation, a delete operation or a modification operation on an existing data item. FIG. 2 illustrates an example of this for the update path shown for insert, update, and delete operations where modifications are made to both the old copy 108 of data items and the new copy 110 of data items when such operations are requested by a user. In some such embodiments, the method 300 may further include changing a query plan directed to the old copy of database items to a query plan directed to both the new copy of database items and the old copy of database items. In the example illustrated above, this may be performed by the query optimizer 120.

The method 300 may be practiced where servicing user queries on the old copy of database items comprises servicing the queries from only the old copy of database items and not the new copy of the database items when the user queries comprise only retrieving data. For example, as illustrated in FIG. 2, when the command is a select command which does not modify, insert or delete data, the query can be serviced from the old copy 108 of the database items.

The method 300 may be practiced where transforming the old copy of database items to a new copy of database items comprises splitting a column. For example, a name column may be split into a first name column and a last name column.

The method 300 may be practiced where transforming the old copy of database items to a new copy of database items comprises changing a data property for a column. For example, embodiments may change the type of the column. In the example illustrated in FIG. 2, the type is changed from int to bigint.

The method 300 may be practiced where transforming the old copy of database items to a new copy of database items comprises adding a new column. Alternatively or additionally, the method 300 may be practiced where transforming the old copy of database items to a new copy of database items comprises combining a column. Alternatively or additionally, the method 300 may be practiced where transforming the old copy of database items to a new copy of database items comprises deleting a column.

The method 300 may further comprise restoring a database, such as for example by detecting a database failure and rolling back the database by discarding the new copy of database items and continuing database operations with the old copy of database items.

Because of the use of both an old copy 108 of database items and a new copy 110 of database items, certain embodiments of the method 300 may further include identifying log operations that do not need to be performed as a result of maintaining both the old copy of database items and the new copy of database items.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of transforming a database while allowing the data in the database to be available to database users during the transformation of the database, the method comprising:
    creating a new version of metadata for old database items for the database for transforming the old copy of database items from an old column type to a new copy of database items in a new column type for the database;
    migrating a copy of the old database items from the old column type to the new column type;
    while migrating the copy of the old database items:
        transforming the copy of the old database items to the new copy of database items according to the new version of the metadata;
        receiving a user query made against the old database items while migrating the copy of the old database items;
        based at least on the received query, generating a query plan directed to data updates to the copy of old of database items;
        changing the query plan directed to the copy of old copy of database items to a query plan directed to both the new copy of database items and the copy of old database items; and
        servicing the user query made against the old database items using the new copy of the database items and the copy of the old database items to allow the database to remain online while transforming the copy of the old database items to the new copy of database items in the database.

2. The method of claim 1, further comprising identifying log operations that do not need to be performed as a result of maintaining both the old copy of database items and the new copy of database items.

3. The method of claim 1, wherein servicing the user query made against the old database items comprises servicing the user query from the new copy of database items and the old database items.

4. The method of claim 3, wherein servicing the user query made against the old database items further includes updating both the new copy of database items and the old copy of database items when the user query comprises data updates.

5. The method of claim 1, wherein the user query made against the old database items comprises data updates to the old copy of database items, the data updates triggering requests to alter a table comprising the old database items according to the query plan, and based on a type of the table being altered, changing the query plan to maintain the table comprising the old database items and a new table comprising the new copy of database items.

6. The method of claim 1, further comprising blocking a second user query before completing the user query.

7. The method of claim 1, further comprising servicing the user query made against the old database items using the copy of the old database items and without using the new copy of the database unless explicitly requested.

8. The method of claim 1, wherein the data updates triggering requests to alter a table comprising the old database items according to a query plan.

9. The method of claim 1, wherein transforming the copy of the old database items to the new copy of database items comprises combining a column.

10. The method of claim 1, wherein transforming the copy of the old database items to the new copy of database items comprises deleting a column.

11. The method of claim 1, further comprising:
    detecting a database failure; and
    rolling back the database by discarding the new copy of database items and continuing database operations with the old database items.

12. The method of claim 1, further comprising identifying log operations that do not need to be performed as a result of maintaining both the old database items and the new copy of database items.

13. A system for transforming a database while allowing the data in the database to be available to database users during the transformation of the database, the system comprising
    one or more processors; and
    one or more computer readable media, wherein the one or more computer readable media comprise computer executable instructions that when executed by at least one of the one or more processors cause at least one of the one or more processors to perform the following:
        creating a new version of metadata for old database items for the database for transforming the old database items from an old column type to a new copy of database items in a new column type for the database;
    migrating a copy of the old database items from the old column type to the new column type;
        while migrating the copy of the old database items:
            transforming the copy of the old database items to the new copy of database items according to the new version of the metadata;

receiving a user query made against the old database items while migrating the copy of the old database items;

based at least on the received query, generating a query plan directed to data updates to the copy of old of database items;

changing the query plan directed to the copy of old copy of database items to a query plan directed to both the new copy of database items and the copy of old database items; and servicing the user query made against the old database items using the new copy of database items and the copy of the old database items to allow the database to remain online while transforming the copy of the old database items to the new copy of database items.

14. The system of claim 13, wherein only one user query can be made against the old copy of the database at a time.

15. The system of claim 13, further comprising a query optimizer configured to facilitate servicing user queries made against the old database items by changing queries to be applied to both the new copy of database items and the old database items, including updating both the new copy of database items and the old database items when the user queries comprise data updates.

16. The system of claim 13, wherein servicing user queries made against the old database items comprises servicing the queries from the old database items when the user queries comprise only retrieving data.

17. One or more computer readable storage media comprising computer executable instructions that when executed by one or more processors cause the following method to be performed:

creating a new version of metadata for old database items for the database for transforming the old database items from an old column type to a new copy of database items in a new column type for the database;

migrating a copy of the old database items from the old column type to the new column type;

while migrating the copy of the old database items:
transforming the copy of the old database items to the new copy of database items according to the new version of the metadata;

receiving a user query made against the old database items while migrating the copy of the old database items;

based at least on the received query, generating a query plan directed to data updates to the copy of old of database items;

changing the query plan directed to the copy of old copy of database items to a query plan directed to both the new copy of database items and the copy of old database items; and servicing the user query made against the old database items using the new copy of the database items and the copy of the old database items to allow the database to remain online while transforming the copy of the old database items to the new copy of database items.

18. The one or more computer readable storage media of claim 17, further comprising computer executable instructions that when executed by the one or more processors cause the following to be performed: identifying log operations that do not need to be performed as a result of maintaining both the old copy of database items and the new copy of database items.

19. The one or more computer readable storage media of claim 17, wherein servicing user queries made against the old database items comprises servicing the queries from the new copy of database items and the old database items, including updating both the new copy of database items and the old database items when the user queries comprise data updates.

20. The one or more computer readable storage media of claim 17, wherein servicing user queries on the old database items comprises servicing the queries from the old database items when the user queries comprise only retrieving data.

* * * * *